(12) United States Patent
Mahajan et al.

(10) Patent No.: US 8,225,131 B2
(45) Date of Patent: Jul. 17, 2012

(54) MONITORING SERVICE ENDPOINTS

(75) Inventors: Saurabh Mahajan, Redmond, WA (US); Vladimir Shubin, Redmond, WA (US); Kevin Thomas Damour, Redmond, WA (US); Thekkthalackal Varugis Kurien, Sammamish, WA (US); Lihua Yuan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/817,264

(22) Filed: Jun. 17, 2010

(65) Prior Publication Data
US 2011/0314326 A1      Dec. 22, 2011

(51) Int. Cl.
*G06F 11/00* (2006.01)
(52) U.S. Cl. .................. 714/4.1; 714/47.1; 709/224
(58) Field of Classification Search ............ 714/4.1, 714/47.1; 709/224
See application file for complete search history.

(56) References Cited

U.S. PATENT DOCUMENTS

| | | | |
|---|---|---|---|
| 6,854,069 B2 | 2/2005 | Kampe et al. | |
| 7,197,565 B2* | 3/2007 | Abdelaziz et al. | 709/226 |
| 7,685,109 B1 | 3/2010 | Ransil et al. | |
| 2002/0032880 A1* | 3/2002 | Poletto et al. | 714/4 |
| 2003/0041141 A1* | 2/2003 | Abdelaziz et al. | 709/223 |
| 2003/0061340 A1 | 3/2003 | Sun et al. | |
| 2004/0010716 A1 | 1/2004 | Childress et al. | |
| 2004/0078419 A1* | 4/2004 | Ferrari et al. | 709/201 |
| 2006/0195561 A1 | 8/2006 | Keane et al. | |
| 2007/0028096 A1* | 2/2007 | England et al. | 713/156 |
| 2007/0162595 A1* | 7/2007 | Samprathi | 709/224 |
| 2009/0037763 A1* | 2/2009 | Adhya et al. | 714/4 |
| 2010/0036903 A1 | 2/2010 | Ahmad et al. | |
| 2010/0302940 A1* | 12/2010 | Patel et al. | 370/230 |

OTHER PUBLICATIONS

Isard; Michael, "Autopilot: automatic data center management"—Published Date: Apr. 2007, pp. 1-8, http://research.microsoft.com/pubs/64604/osr2007.pdf.
"Ganglia Monitoring System"—Published Date: Mar. 8, 2010 http://ganglia.info/.
"Professionally staffed proactive Service Availability Monitoring"—Retrieved Date: Apr. 15, 2010 http://www.vigilancemonitoring.com/products.php.
"Nimsoft"—Retrieved Date: Apr. 15, 2010 http://www.nimsoft.com/solutions/datacenter-network/index.php.
"Perspective"—Retrieved Date: Apr. 15, 2010 http://www.scriptlogic.com/products/perspective/features.asp.

\* cited by examiner

*Primary Examiner* — Robert Beausoliel, Jr.
*Assistant Examiner* — Elmira Mehrmanesh
(74) *Attorney, Agent, or Firm* — Microsoft Corporation (57) ABSTRACT

Today, data networks are ever increasing in size and complexity. For example, a datacenter may comprise hundreds of thousands of service endpoints configured to perform work. To reduce network wide degradation, a load balancer may send work requests to healthy service endpoints, as opposed to unhealthy and/or inoperative service endpoints. Accordingly, among other things, one or more systems and/or techniques for monitoring service endpoints, which may be scalable for large scale networks, are provided. In particular, a consistent hash function may be performed to generate a monitoring scheme comprising assignments of service endpoints to monitoring groups. In this way, multiple monitoring components may monitor a subset of endpoints to ascertain health status. Additionally, the monitoring components may communicate between one another so that a monitoring component may know heath statuses of service endpoints both assigned and not assigned to the monitoring component.

20 Claims, 7 Drawing Sheets

MONITORING SERVICE ENDPOINTS

BACKGROUND

Today, many networks are becoming larger and more complex. For example, some datacenters may comprise over a hundred thousand machines configured to accomplish work tasks under the direction of load balancers. In order to efficiently manage the large number of service endpoints, monitors may be employed to monitor service endpoints for communication and system health. It may be advantageous to monitor the health of service endpoints so that a load balancer may utilize healthy service endpoints, as opposed to unhealthy service endpoints. Otherwise, severe network wide degradation may result when non-functional service endpoints are utilized.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for monitoring service endpoints are disclosed herein. In particular, a consistent hash function may be performed upon identifiers of service endpoints (e.g., ip address+port number of a service endpoint machine) to generate a monitoring scheme. It is to be appreciated that while a hash function or a consistent hash function is at times mentioned herein for generating a monitoring scheme, a variety of functions and/or algorithms are contemplated for generating a monitoring scheme. Accordingly, a hash function (e.g., as used herein) may comprise any suitable mechanism, technique, function, algorithm, etc. for generating a monitoring scheme. The monitoring scheme may comprise an assignment of service endpoints to monitoring groups. In one example, service endpoints may be assigned to merely a single monitoring group within the monitoring scheme (e.g., assignment may be made so that there is no overlap of monitoring). Alternatively, one or more service endpoints may be assigned to more than one monitoring group. It may be appreciated that a monitoring group may comprise one or more monitoring nodes. A monitoring node of a monitoring group may be configured to monitor service endpoints assigned to the monitoring group. In one example, a monitoring group (1) may comprise a monitoring node (1) and a monitoring node (2). The monitoring group (1) may be assigned to monitor service endpoint (B), service endpoint (C), and service endpoint (G). The monitoring node (1) may monitor service endpoints (B), (C), and (G), and monitoring node (2) may also monitor service endpoints (B), (C), and (G). The overlap in monitoring may increase monitoring reliability in the event a monitoring node fails.

A monitoring group may be configured to receive status information of monitored service endpoints from monitoring nodes within the monitoring group (e.g., a health status relating to the operability and current state of a service endpoint). The status may comprise a binary measurement (e.g., healthy or unhealthy) and/or scaled measurements (e.g., 0 to 100) regarding the status of service endpoints. Scaled measurements may, for example, enable complex scenarios, such as taking a system offline and/or the implementation of complex algorithms to increase efficiency of load balancing requests amongst service endpoints. The monitoring group may maintain health status data for service endpoints (e.g., status information returned by monitoring nodes regarding service endpoints assigned to the monitoring group, status changes received from other monitoring groups regarding service endpoints assigned to other monitoring groups, etc.). In this way, a "snap shot" of the entire endpoint network's health may be stored by respective monitoring groups. Since in an example embodiment health status data for a set of service endpoints is stored in multiple monitoring groups, when one of those monitoring groups fails, health status data for the set of service endpoints stored in one or more of the other monitoring groups may be used for reassignment. That is, other monitoring groups may be reassigned to monitor the set of service endpoints, previously monitored by the failed monitoring group, using the stored health status data.

Monitoring groups may be configured to communicate with one another regarding status changes. It may be appreciated that in an example embodiment monitoring groups may communicate status changes, as opposed to unchanged status information, to reduce network traffic. Thus, if a status changes, then a monitoring group may communicate the change to other monitoring groups, otherwise few to no communications occur to reduce traffic. Additionally, a monitoring group may communicate a status change of a service endpoint monitored by a different monitoring group. For example, a first monitoring group may determine that a service endpoint has changed from healthy to unhealthy. The first monitoring group may send a communication to a second monitoring group about the change in status from healthy to unhealthy. The second monitoring group, which doesn't monitor the service endpoint, may send a communication about the status change to a third monitoring group. In this way, status changes may be propagated amongst monitoring groups. Additionally, monitoring groups may communicate status changes to distributed clients not within monitoring groups.

It may be appreciated that monitoring groups may fail (e.g., due to a network failure, a hardware failure, a software failure, etc.). If a failed monitoring group is determined, then service endpoints assigned to the failed monitoring group within the monitoring scheme may be redistributed (reassigned) to one or more monitoring groups different from the failed monitoring group.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Today, many computing networks are implemented on a large scale. For example, a computing network may comprise hundreds of thousands of service endpoints configured to accomplish work tasks delegated by load balancers. It may be advantageous for such load balancers to delegate work tasks to healthy service endpoints, as opposed to unhealthy service endpoints that may be unfit to perform work tasks. For example, an unhealthy service endpoint may comprise a service endpoint with a hardware or software failure or a service endpoint having inadequate resources, such as available memory or processor cycles to complete current tasks, etc. A healthy endpoint may comprise a service endpoint with available resources sufficient to perform current and/or future tasks. Monitors may be implemented to monitor communication and health status of service endpoints. Current monitoring techniques may employ a single monitoring component that monitors all service endpoints. Unfortunately, a single monitoring component may not scale well for large scale computing networks. For example, a single monitoring component may be unable to manage hundreds of thousands of monitoring nodes.

Accordingly, among other things, one or more systems and/or techniques for monitoring service endpoints are provided herein. In particular, multiple monitoring groups may be assigned to monitor a subset of service endpoints to ascertain, store, and/or share service endpoint status data. A monitoring group may monitor assigned service endpoints using one or more monitoring nodes. Status changes (e.g., a previous health status of 10 may change to a health status of 50) may be communicated amongst monitoring groups so that a monitoring group may comprise health status data representing not only service endpoints monitored by the monitoring group, but also one or more service endpoints monitored by other monitoring groups. The assignment of service endpoints to monitoring groups may be accomplished through a consistent hashing scheme used to generate a monitoring scheme comprising assignments of service endpoints to monitoring groups.

Figure 1:
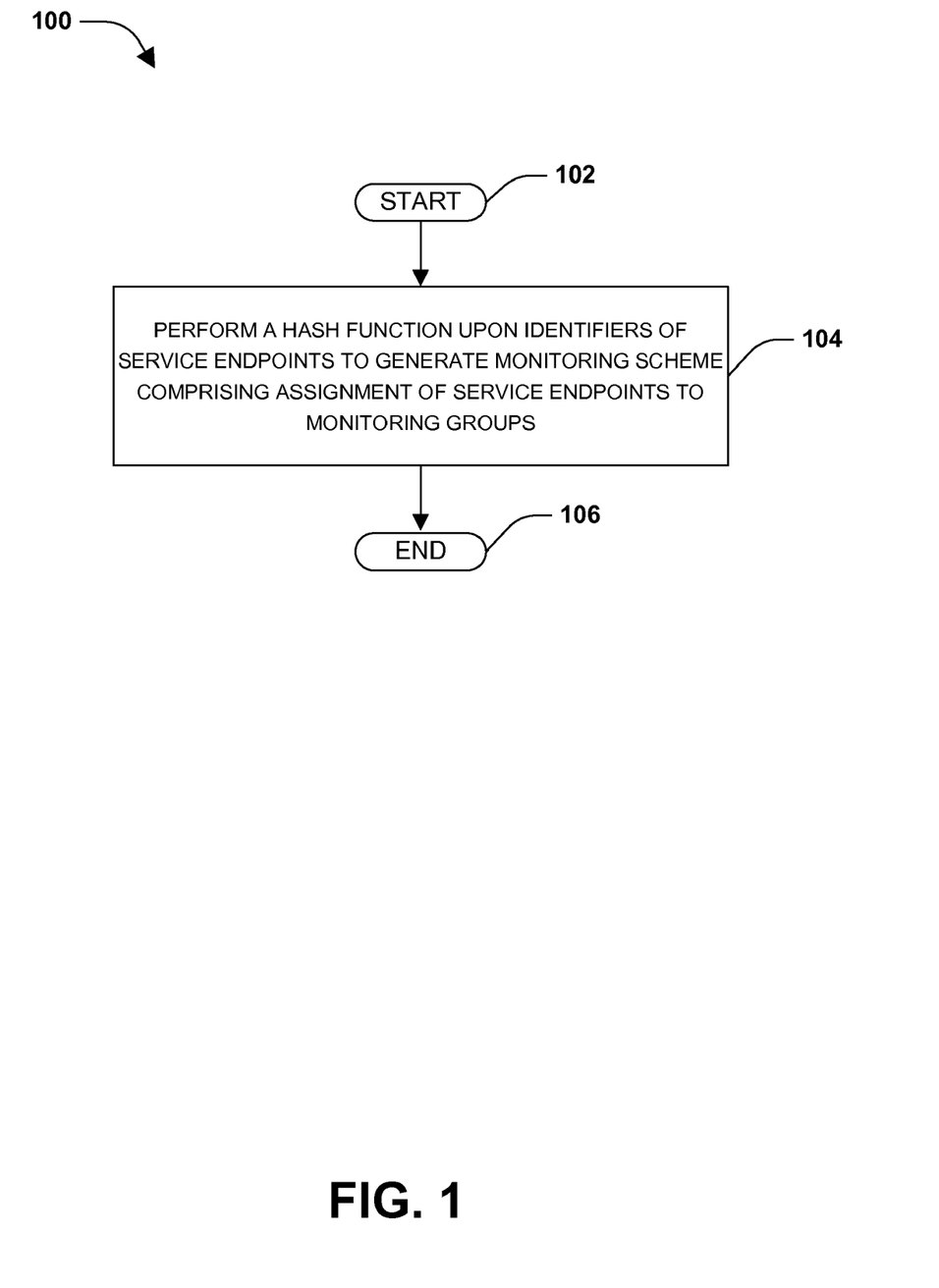
FIG. 1 is a flow chart illustrating an exemplary method of monitoring service endpoints.

One embodiment of monitoring service endpoints is illustrated by an exemplary method 100 in FIG. 1. At 102, the method starts. At 104, a hash function may be performed upon identifiers of service endpoints (e.g., an IP address and/or port number) to generate a monitoring scheme (e.g., monitoring scheme 302 of FIG. 3) comprising assignment of service endpoints to monitoring groups. For example, a consistent hash function may be used to generate the monitoring scheme. The consistent hash function may provide hash table functionality, where a change in nodes (e.g., service endpoints and/or monitoring groups) may not result in significant remapping of service endpoints to monitoring groups. Thus, if a monitoring group fails, then service endpoints may be reassigned with minimal reassignments, as opposed to a traditional hash that may require extensive reassignment of service endpoints to monitoring groups. In one example, the monitoring scheme may comprise an assignment such that respective service endpoints are assigned to merely a single monitoring group within the monitoring scheme to inhibit duplicate monitoring by different monitoring groups. A monitoring group may comprise one or more monitoring nodes. In one example, a monitoring node of a monitoring group may be configured to monitor one or more service endpoints assigned to the monitoring group. In another example, a monitoring node of a monitoring group may be configured to monitor all service endpoints assigned to the monitoring group. Monitoring nodes within a monitoring group may be configured to monitor the same or different service endpoints assigned to a monitoring group (e.g., monitoring node (1) and monitoring node (2) may monitor the same service endpoints (A), (C), and (D) to provide redundancy and error checking, or different service endpoints to conserve resources).

It may be appreciated that hundreds of thousands of service endpoints may be monitored based upon the monitoring scheme. Additionally, the number of monitoring groups and/or monitoring nodes comprised therein may be scaled accordingly.

In one example, a first monitoring group may be assigned to monitor a first service endpoint. The first monitoring group may comprise a first monitoring node and a second monitoring node. A second monitoring group may be assigned to monitor a second service endpoint. A third monitoring group may be assigned to monitor a third service endpoint and a fourth service endpoint. A monitoring group may be configured to receive status data regarding monitored service endpoints from monitoring nodes within the monitoring groups (e.g., a binary measurement of healthy or unhealthy or a scaled measurement of 1-100, etc.). Monitoring groups may send status data to distributed clients external to the monitoring groups. For example, the first monitoring group may send a communication to a distributed client not within a monitoring group; the communication may indicate a health status change of the first service endpoint monitored by the first monitoring group based upon the monitoring scheme.

The first monitoring group may receive a first status of the first service endpoint from the first monitoring node. The first monitoring group may receive a second status of the first service endpoint from the second monitoring node. The first status and/or second status may be used to store health status data. For example, the first status may indicate that the first service endpoint has a current health rating between 70 and 80, and the second status may indicate that the first service endpoint has a current health rating between 75 and 80. In one example, health status data indicating the first monitoring node determined the first service endpoint has a current health rating between 70 and 80 and the second monitoring node determined the first service endpoint has a current health rating between 75 and 80 may be stored. In another example, health status data indicating that the first service endpoint has a health rating around 70 to 80 may be stored. It may be appreciated that health status data may be stored in a variety of formats.

The first monitoring group may be configured to resolve inconsistencies between the first status and the second status if the first status is different from the second status. It may be appreciated that a variety of techniques may be used to resolve inconsistencies. For example, the first service endpoint may be marked as unhealthy if one or more statuses indicate the first service endpoint is unhealthy.

Monitoring groups may communicate with one another regarding status changes. In one example, the first monitoring group may send a communication to the second monitoring group indicative of a status change of a service endpoint monitored by the first monitoring group based upon the monitoring scheme (e.g., the first service endpoint may have had a status of 80, which may have changed after the first monitoring node and/or second monitoring node returned a status of 10). In this way, both the first monitoring group and the second monitoring group may know the status of the first service endpoint, even though the first service endpoint may not be monitored by the second monitoring group.

In another example, the first monitoring group may receive a communication from the second monitoring group, the communication may be indicative of a status change of the second service endpoint monitored by the second monitoring group based upon the monitoring scheme (e.g., second service endpoint may have had a status of unhealthy, which may have changed after one or more monitoring nodes within the second monitoring group returned a status of healthy). Additionally, the first monitoring component may send a communication to the third monitoring group indicative of the status change of the second service endpoint monitored by the second monitoring group based upon the monitoring scheme (e.g., upon the first monitoring group receiving the status change communication from the second monitoring group, the first monitoring group may notify the third monitoring group of the status change detected by the second monitoring group). In this way, the second monitoring group, the first monitoring group, and the third monitoring group may know the status of the second service endpoint, even though the second service endpoint may not be monitored by the first monitoring group and/or the third monitoring group.

To recover from a monitoring group failure, a failed monitoring group may be determined. The failed monitoring group may have been assigned within the monitoring scheme to monitor one or more service endpoints. It may be appreciated that other monitoring groups may have status data regarding the one or more service endpoints because of intercommunication of status changes between monitoring groups (e.g., the failed monitoring group may have sent communications regarding status changes to other monitoring groups before failure). The status data may be utilized in redistributing the one or more service endpoints (previously) assigned to the failed monitoring group within the monitoring scheme to one or more monitoring groups different from the failed monitoring group (e.g., see FIG. 4 for an example of redistributing service endpoints of a failed monitoring group). In this way, reassigned monitoring groups may use the status data of the redistributed service endpoints to resume monitoring. At 106, the method ends.

Figure 2:
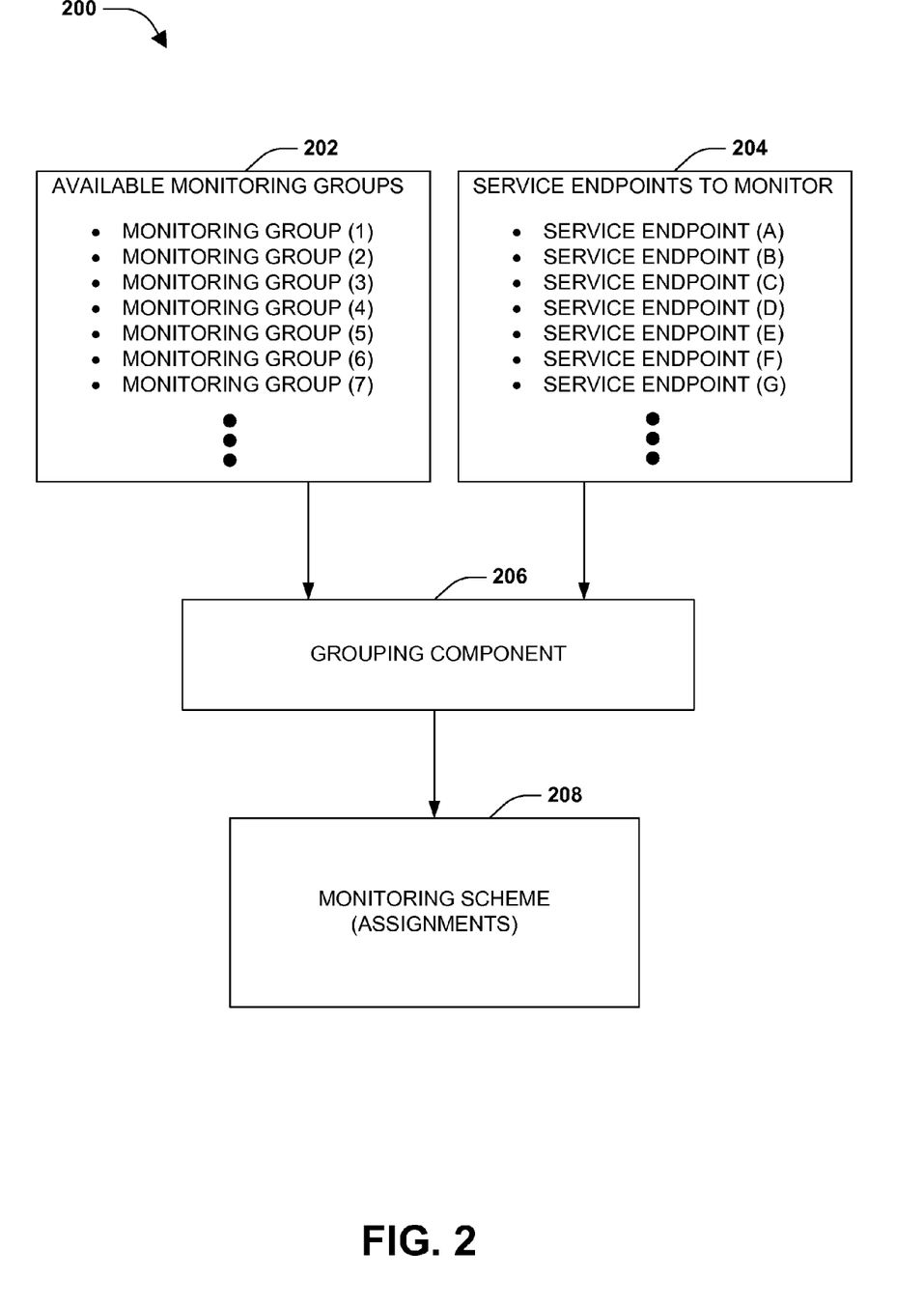
FIG. 2 is a component block diagram illustrating an exemplary system for monitoring service endpoints.

FIG. 2 illustrates an example of a system 200 configured for monitoring service endpoints. The system 200 may comprise a grouping component 206 configured to perform a consistent hash function upon identifiers of service endpoints to generate a monitoring scheme 208 comprising assignments of service endpoints to monitoring groups. In one example, the grouping component 206 may receive available monitoring groups 202 comprising identifiers associated with monitoring groups (1)-(7) and/or other monitoring groups not illustrated. Additionally, the grouping component 206 may receive a list 204 of service endpoints to monitor, the list 204 comprising a list of service endpoints (A)-(G) and/or other service endpoints not illustrated. The grouping component 206 may assign service endpoints to monitoring groups within the monitoring scheme 208.

In one example, a first monitoring group may be assigned to monitor one or more service endpoints. The first monitoring group may comprise a first monitoring node configured to monitor the one or more service endpoints assigned to the first monitoring group within the monitoring scheme 208. The first monitoring group may comprise a second monitoring node configured to monitor the one or more service endpoints assigned to the first monitoring group within the monitoring scheme 208. The first monitoring group may be configured to receive status data from the first monitoring node and/or the second monitoring node regarding the one or more service endpoints. For example, the first monitoring group may receive a first status of a first service endpoint (e.g., a service endpoint assigned to the first monitoring group within the monitoring scheme 208) from the first monitoring node. The first monitoring group may receive a second status of the first service endpoint from the second monitoring node. It may be appreciated that the first monitoring group may store status data regarding the first and/or second status. The first monitoring group may be configured to determine whether the first status and the second status are different. If the first status and the second status are different, then the first monitoring group may resolve inconsistencies between the first status and the second status (e.g., a health status for the service endpoint may be determined as an average value of the first and second status; if at least one status is unhealthy, then the service endpoint may be marked as unhealthy; etc.).

Monitoring groups may be configured to communicate status changes with one another. For example, a first monitoring group may be configured to send a communication to a second monitoring group, the communication may be indicative of a status change of a first service endpoint monitored by the first monitoring group based upon the monitoring scheme 208. The second monitoring group may be configured to send a communication to a third monitoring group, the communication may be indicative of the status change of the first service endpoint monitored by the first monitoring group based upon the monitoring scheme 208. In this way, the first monitoring group, the second monitoring group, and the third monitoring group may know the status of the first service endpoint, even though the first service endpoint may not be monitored by the second monitoring group and/or the third monitoring group as per the monitoring scheme 208.

It may be appreciated that monitoring groups may fail. A failed monitoring group may have one or more service endpoints assigned to the failed monitoring group based upon the monitoring scheme 208. The grouping component 206 may be configured to redistribute one or more service endpoints (previously) assigned to the failed monitoring group within the monitoring scheme 208 to one or more monitoring groups different from the failed monitoring group. The redistribution may mitigate monitoring downtime caused by the failed monitoring group, and may be based upon intercommunication of status changes between monitoring groups, for example (e.g., see FIG. 4 for an example of redistributing service endpoints of a failed monitoring group).

Figure 3:
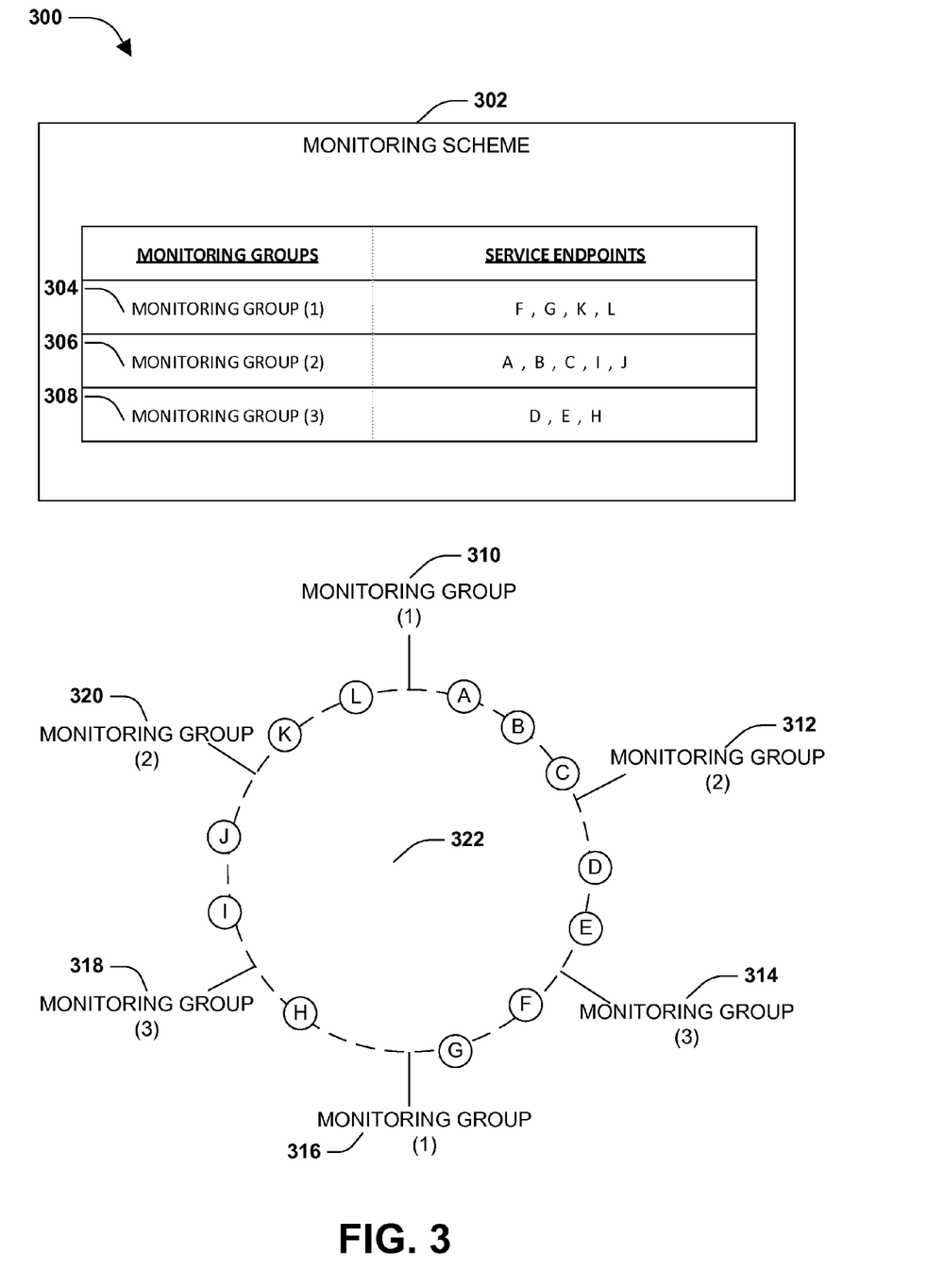
FIG. 3 is an illustration of an example of generating a monitoring scheme based upon a consistent hash function.

FIG. 3 illustrates an example 300 of generating a monitoring scheme 302 based upon a consistent hash function. It may be appreciated that a circle structure 322 is merely provided to illustrate how the consistent hash function may assign service endpoints to monitoring groups and is not meant to be limiting. In one example, the consistent hash function may be configured to assign service endpoints (A)-(L) and/or other service endpoints not illustrated to points around the circle structure 322. For example, a random function may be applied to identifiers, such as ip address and/or port number, of the service endpoints to determine points on the circle structure 322 at which to map the service endpoints. Additionally, monitoring groups (e.g., monitoring group (1) 304, monitoring group (2) 306, monitoring group (3) 308, and/or other monitoring groups not illustrated) may be randomly mapped to points around the circle structure 322.

The monitoring scheme 302 may be generated by traversing the circle structure 322 clockwise, and assigning a service endpoint to a first occurring monitoring group. For example, service endpoints A, B, and C may be assigned to monitoring group (2) 306 within the monitoring scheme 302 because monitoring group (2) at point 312 may be the first occurring monitoring group encountered when traveling clockwise from the service endpoints A, B, and C respectively. Service endpoints D and E may be assigned to monitoring group (3) 308 within the monitoring scheme 302 because monitoring group (3) at point 314 may be the first occurring monitoring group encountered when traveling clockwise from service endpoints D and E respectively. Service endpoints F and G may be assigned to monitoring group (1) 304 within the monitoring scheme 302 because monitoring group (1) at point 316 may be the first occurring monitoring group encountered when traveling clockwise from service endpoints F and G respectively.

Service endpoint H may be assigned to monitoring group (3) 308 within the monitoring scheme 302 because monitoring group (3) at point 318 may be the first occurring monitoring group encountered when traveling clockwise from service endpoint H. Service endpoints I and J may be assigned to monitoring group (2) 306 within the monitoring scheme 302 because monitoring group (2) at point 320 may be the first occurring monitoring group encountered when traveling clockwise from service endpoints I and J respectively. Service endpoints K and L may be assigned to monitoring group (1) 304 within the monitoring scheme 302 because monitoring group (1) at point 310 may be the first occurring monitoring group encountered when traveling clockwise from service endpoints K and L respectively. In this way, the monitoring scheme 302 may be generated based upon the consistent hash function.

Figure 4:
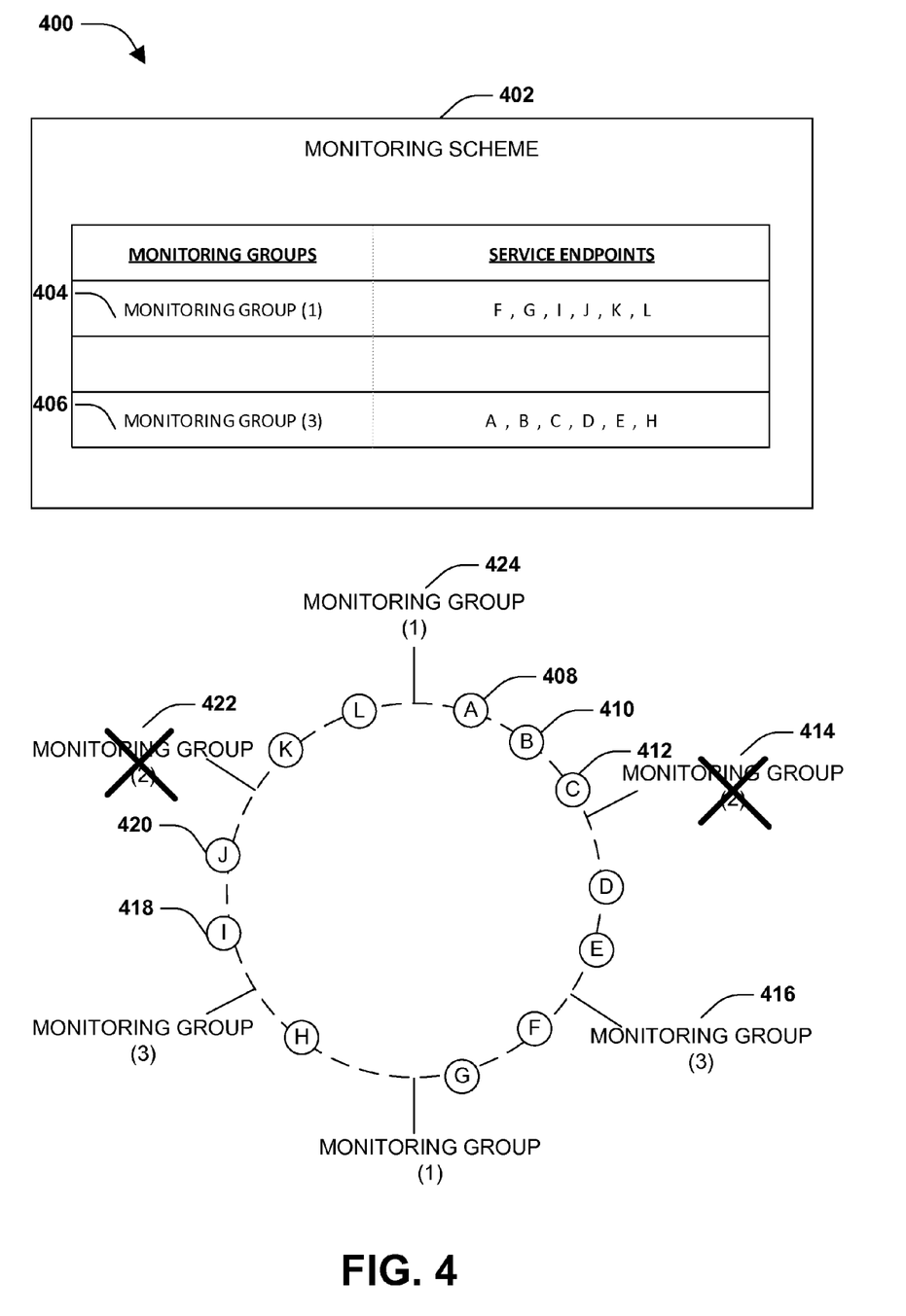
FIG. 4 is an illustration of an example of redistributing service endpoints assigned to a failed monitoring group.

FIG. 4 illustrates an example 400 of redistributing service endpoints assigned to a failed monitoring group. A monitoring scheme 402 may comprises assignments of service endpoints to monitoring groups. It may be appreciated that the monitoring scheme 402 in example 400 may illustrate the monitoring scheme 402 after a redistribution (e.g., see monitoring scheme 302 of FIG. 3 for an example of the monitoring scheme before the redistribution). That is, the monitoring scheme 402 may have previously had assignments of service endpoints to monitoring groups (e.g., service endpoints F, G, K, and L assigned to monitoring group (1) 404; service endpoints A 408, B 410, C 412, I 418, and J 420 assigned to monitoring group (2); and service endpoints D, E, and H assigned to monitoring group (3)).

It may be determined that monitoring group (2) is a failed monitoring group (e.g., monitoring group (2) may have had a hardware failure). For example, service endpoints A 408, B 410, C 412, I 418, and J 420, which were previously monitored by failed monitoring group (2), may now be unmonitored due to the failure. Thus, the service endpoints A 408, B 410, C 412, I 418, and J 420 (previously) assigned to the failed monitoring group (2) may be redistributed (reassigned) to one or more monitoring groups different from the failed monitoring group (2). In this way, the monitoring scheme 402 may be updated to reflect the redistribution.

It may be appreciated that a circle structure is merely provided to illustrate how a consistent hash function may redistribute service endpoints to monitoring groups but this is not meant to be limiting. In one example, a consistent hash function may be performed to redistribute service endpoints A 408, B 410, C 412, I 418, and J 420, which were previously assigned to the failed monitoring group (2) (e.g., A 408, B 410, C 412 were assigned to failed monitoring group (2) at point 414, and I 418, and J 420 were assigned to failed monitoring group (2) at point 422). Because the failed monitoring group (2) may be unable to monitor service endpoints, the failed monitoring group (2) may be removed from point 414 and point 422 on the circle.

The service endpoints A 408, B 410, C 412, I 418, and J 420 (previously) assigned to failed monitoring group (2) may be reassigned by traversing the circle structure clockwise, and assigning respective service endpoints to first occurring monitoring groups. For example, service endpoints A 408, B 410, and C 412 may be assigned to monitoring group (3) 406 within the monitoring scheme 402 because monitoring group (3) at point 416 may be the first occurring monitoring group encountered when traveling clockwise from service endpoints A 408, B 410, and C 412 respectively. Service endpoints I 418, and J 420 may be assigned to monitoring group (1) 404 within the monitoring scheme 402 because monitoring group (1) at point 424 may be the first occurring monitoring group encountered when traveling clockwise from service endpoints I 418 and J 420 respectively. In this way, the monitoring scheme 402 may be updated, as illustrated in example 400, where service endpoints F, G, I, J, K, and L are assigned to monitoring group (1) 404 and service endpoints A, B, C, D, E, and H are assigned to monitoring group (3) 406. It may be appreciated that the redistribution of service endpoints assigned to failed monitoring groups may not alter assignments or mappings of service endpoints to monitoring groups that have not failed, which may be accomplished based upon the use of a consistent hash algorithm, for example, where different results may be obtained should different algorithms be implemented.

Figure 5:
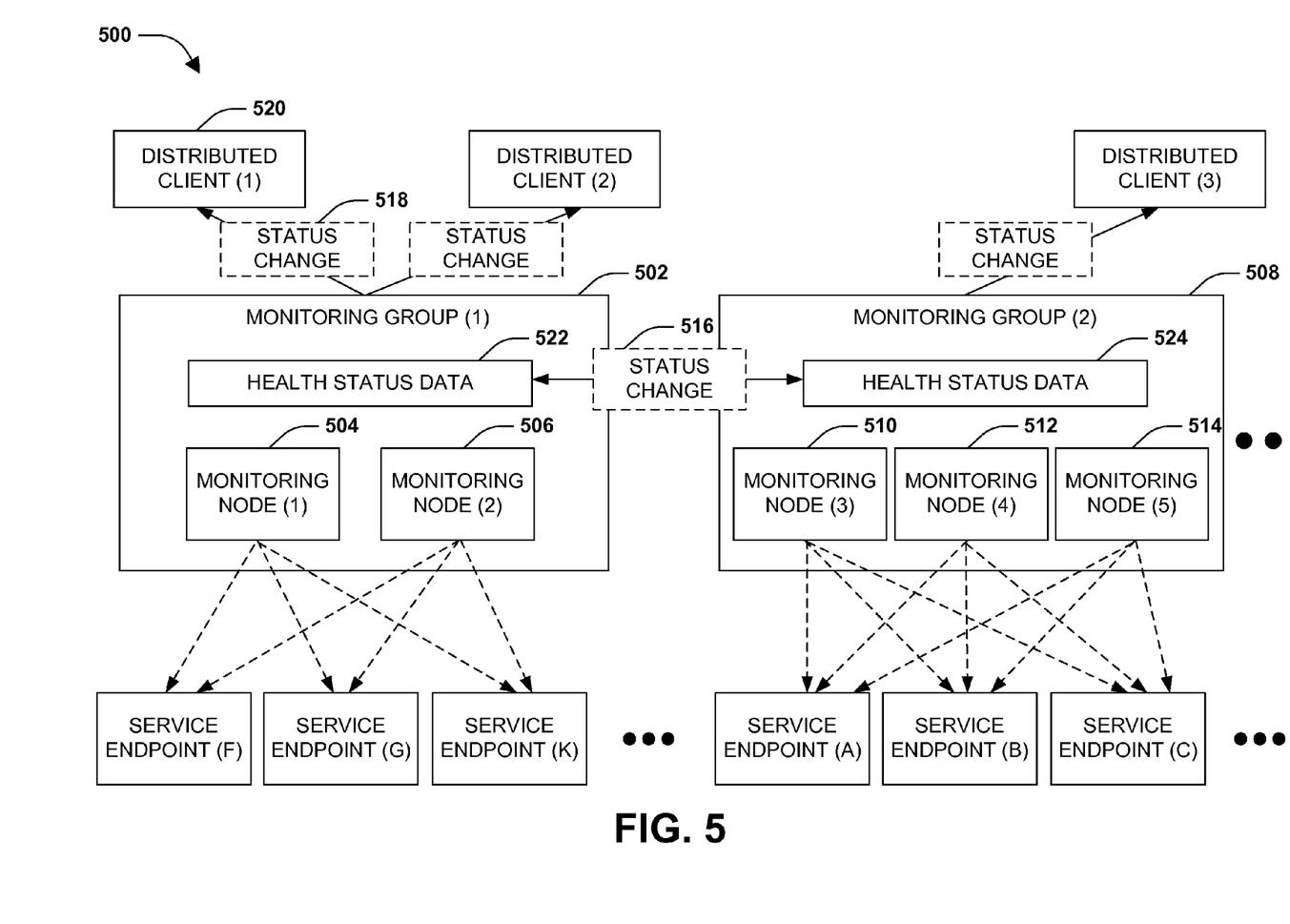
FIG. 5 is an illustration of an example of one or more monitoring groups monitoring service endpoints based upon a monitoring scheme.

FIG. 5 illustrates an example 500 of one or more monitoring groups monitoring service endpoints based upon a monitoring scheme. The monitoring scheme may assign service endpoints F, G, K and/or other service endpoints not illustrated to monitoring group (1) 502; service endpoints A, B, C, and/or other service endpoints not illustrated to monitoring group (2) 508; and/or other assignments not illustrated. Monitoring group (1) 502 may comprise monitoring node (1) 504 and/or monitoring node (2) 506, which may be configured to monitor statuses of the service endpoints F, G, and K. The monitoring group (1) 502 may store status data returned from monitoring node (1) 504 and/or monitoring node (2) 506 as health status data 522. The monitoring group (1) 502 may resolve inconsistencies when monitoring node (1) 504 and monitoring node (2) 506 return statuses that are different (e.g., monitoring node (1) 504 may return a status that service endpoint G is healthy, while monitoring node (2) 506 may return a status that service endpoint G is unhealthy).

Monitoring group (2) 508 may comprise monitoring node (3) 510, monitoring node (4) 512, and/or monitoring node (5) 514, which may be configured to monitor statuses of service endpoints A, B, and C. The monitoring group (2) 508 may store status data returned from monitoring node (3) 510, monitoring node (4) 512, and/or monitoring node (5) 514 as health status data 524. The monitoring group (2) 508 may resolve inconsistencies between statuses returned by the monitoring nodes (3) 510, (4) 512, and/or (5) 514. It may be appreciated that different monitoring nodes within a monitoring group may monitor the same service endpoints (as illustrated) to provide, among other things, redundancy and/or may monitor different service endpoints to conserve resources. Also, one or more service endpoints may merely be monitored by one monitoring group (e.g., no overlap between monitoring groups) or may be monitored by more than one monitoring group (e.g., overlap between monitoring groups).

The monitoring groups may be configured to communicate with one another and/or distributed clients. In one example, monitoring group (2) 508 may receive status data from monitoring node (4) 512 that service endpoint (C) has gone from a healthy state to an unhealthy state. The monitoring group (2) 508 may store the status data within the health status data 524. The monitoring group (2) 508 may send a communication (status change 516) to monitoring group (1) 502 regarding the change in health status. Monitoring group (1) 502 may store the change in health status of service endpoint (C) within the health status data 522. In this way, monitoring group (1) 502 and monitoring group (2) 508 may know the current health state of service endpoint (C). It may be appreciated that similar communications may occur as a result of status changes so that respective monitoring groups (e.g., 502, 508 and other monitoring groups not shown) are aware of the status of different service endpoints being monitored, potentially providing a global status awareness all service endpoints over time. Similarly, this information can be propagated to distributed clients. Additionally, monitoring group (1) 502 may send a communication (status change 518) to distributed client (1) 520 regarding the change in health status of service endpoint (C). It may be appreciated that action may be taken based upon health status data. For example, a load balancer may adjust the distribution of work requests based upon health of service endpoints.

Figure 6:
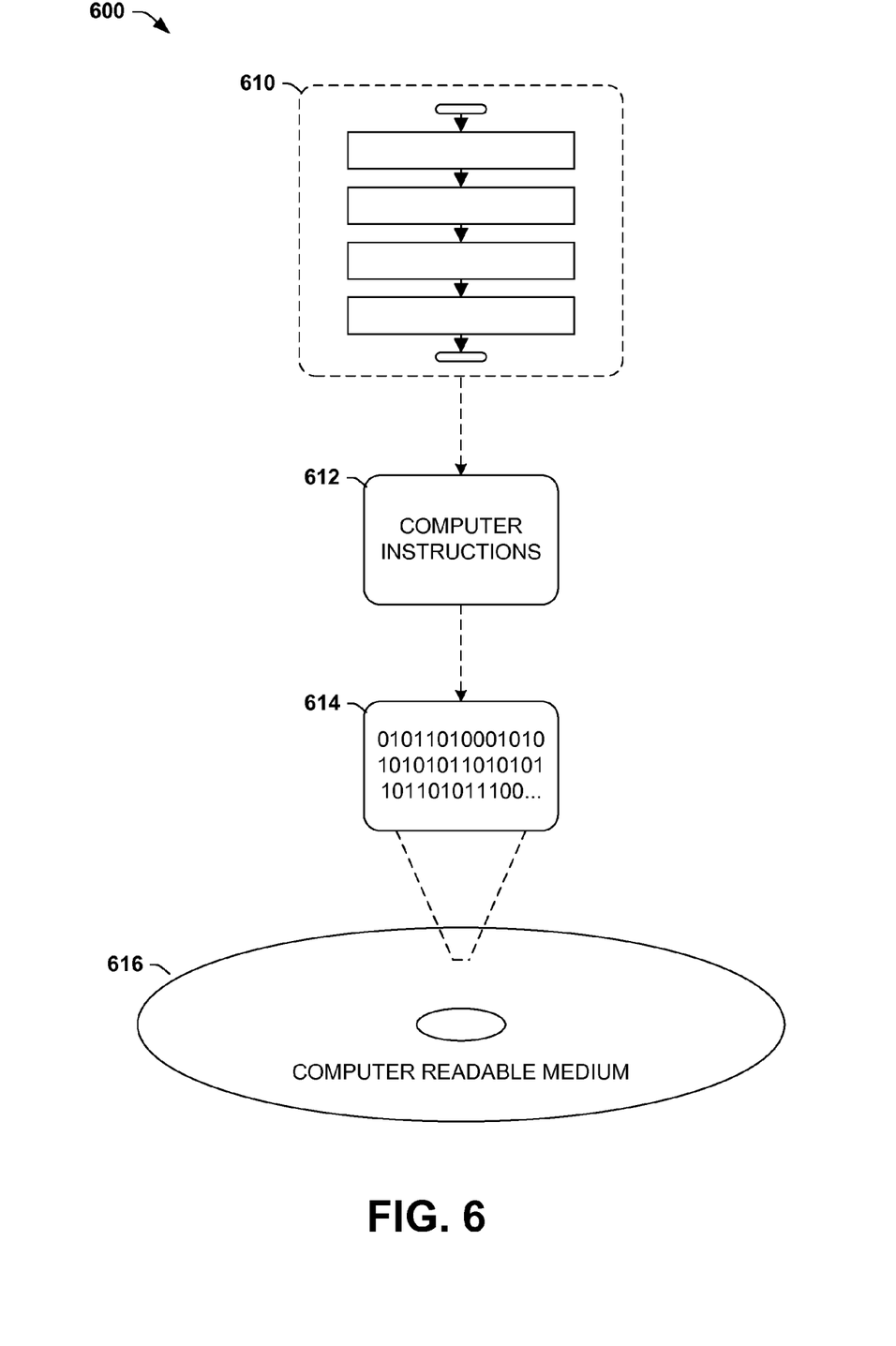
FIG. 6 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 614. This computer-readable data 614 in turn comprises a set of computer instructions 612 configured to operate according to one or more of the principles set forth herein. In one such embodiment 600, the processor-executable computer instructions 612 may be configured to perform a method 610, such as the exemplary method 100 of FIG. 1, for example. In another such embodiment, the processor-executable instructions 612 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
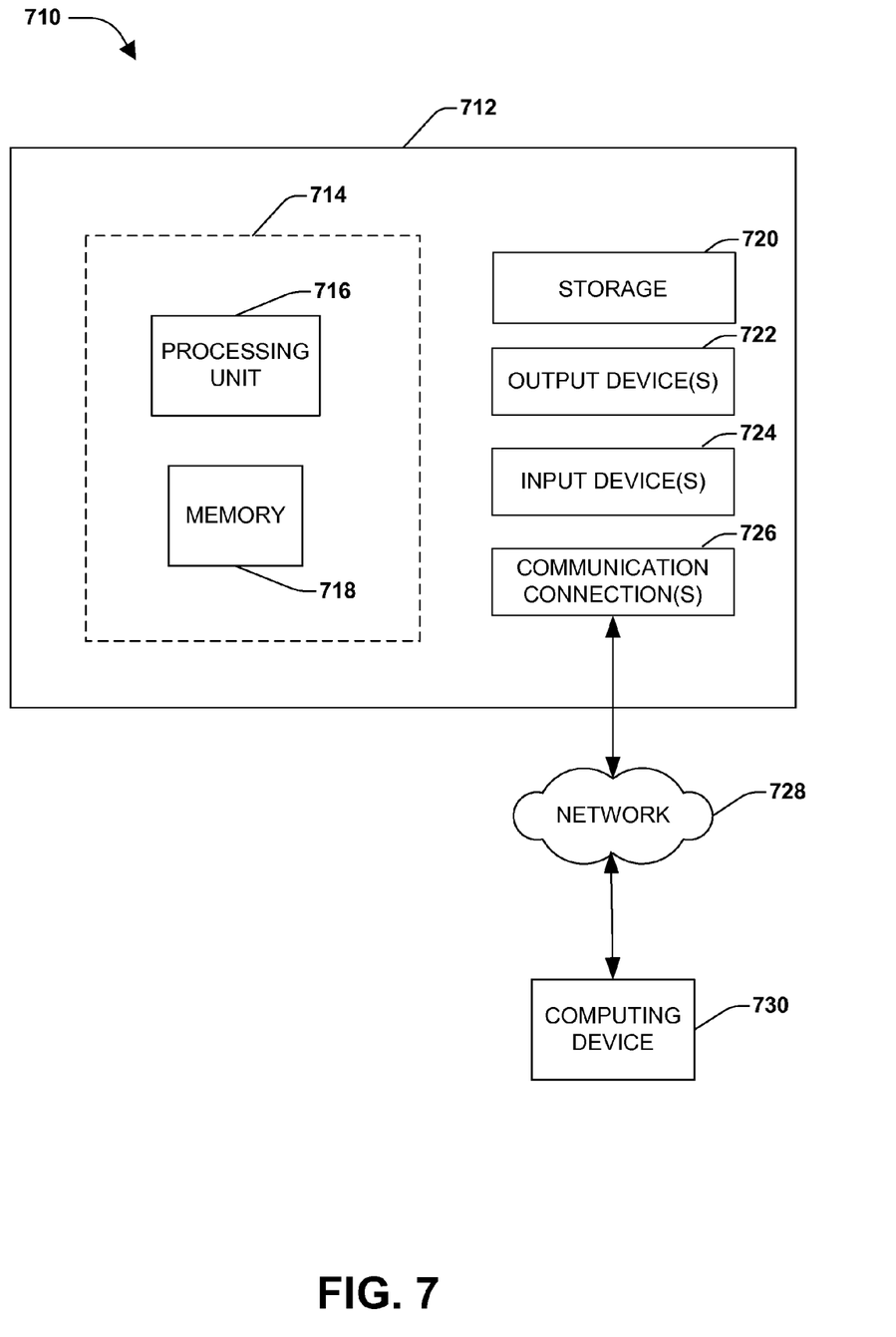
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1374), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for monitoring service endpoints, comprising:
performing a hash function upon identifiers of service endpoints to generate a monitoring scheme comprising an assignment of service endpoints to monitoring groups, the assignment specifying, based upon the performed hash function, that a monitoring node comprised within a monitoring group is to monitor a service endpoint, at least some of the performing implemented at least in part via a processing unit.

2. The method of claim 1, comprising:
sending a communication from a first monitoring group to a second monitoring group, the communication indicative of a status change of a first service endpoint monitored by the first monitoring group based upon the monitoring scheme.

3. The method of claim 1, comprising:
receiving a communication at a first monitoring group from a second monitoring group, the communication indicative of a status change of a second service endpoint monitored by the second monitoring group based upon the monitoring scheme.

4. The method of claim 3, the second service endpoint not assigned to the first monitoring group within the monitoring scheme, the method comprising:
sending a communication from the first monitoring group to a third monitoring group, the communication sent from the first monitoring group indicative of the status change of the second service endpoint monitored by the second monitoring group based upon the monitoring scheme.

5. The method of claim 1, comprising:
sending a communication from a first monitoring group to a distributed client not within a monitoring group, the communication indicative of a health status change of a first service endpoint monitored by the first monitoring group based upon the monitoring scheme.

6. The method of claim 1, where at least some of the service endpoints are assigned to merely a single monitoring group within the monitoring scheme.

7. The method of claim 1, comprising:
receiving a first status of a first service endpoint from a first monitoring node comprised within a first monitoring group; and
receiving a second status of the first service endpoint from a second monitoring node comprised within the first monitoring group.

8. The method of claim 7, the first status different from the second status, the method comprising resolving inconsistencies between the first status and the second status.

9. The method of claim 8, the resolving inconsistencies comprising at least one of:
if the first status indicates the first service endpoint is operating in an unhealthy state and the second status indicates the first service endpoint is operating in a healthy state, then marking the first service endpoint as unhealthy, and
if the first status indicates the first service endpoint is operating in an unhealthy state and the second status indicates the first service endpoint is operating in a healthy state, then marking the first service endpoint as healthy.

10. The method of claim 7, the first status measured in binary measurements or scaled measurements and the second status measured in binary measurements or scaled measurements.

11. The method of claim 1, comprising:
determining a failed monitoring group; and
redistributing one or more service endpoints assigned to the failed monitoring group within the monitoring scheme to one or more monitoring groups different from the failed monitoring group.

12. A system for monitoring service endpoints, comprising:
a grouping component configured to:
perform a hash function upon identifiers of service endpoints to generate a monitoring scheme comprising assignments of service endpoints to monitoring groups;
a first monitoring node within a first monitoring group configured to receive a first status of a first service endpoint, the first status measured in binary measurements or scaled measurements; and
a second monitoring node within the first monitoring group configured to receive a second status of the first service endpoint, the second status measured in binary measurements or scaled measurements, at least some of at least one of the grouping component, the first monitoring node and the second monitoring node implemented at least in part via a processing unit.

13. The system of claim 12, the first monitoring node configured to monitor one or more service endpoints assigned to the first monitoring group within the monitoring scheme.

14. The system of claim 13, the second monitoring node configured to monitor one or more service endpoints assigned to the first monitoring group within the monitoring scheme.

15. The system of claim 14, the first monitoring group configured to:
determine whether the first status and the second status are different; and
upon determining the first status and the second status are different, resolve inconsistencies between the first status and the second status.

16. The system of claim 12, the grouping component configured to:
redistribute one or more service endpoints assigned to a failed monitoring group within the monitoring scheme to one or more monitoring groups different from the failed monitoring group.

17. The system of claim 12, the first monitoring group configured to send a communication to a second monitoring group, the communication indicative of a status change of the first service endpoint monitored by the first monitoring group based upon the monitoring scheme.

18. The system of claim 17, the second monitoring group configured to send a communication to a third monitoring group, the communication indicative of the status change of the first service endpoint monitored by the first monitoring group based upon the monitoring scheme.

19. A computer readable storage medium comprising computer executable instructions that when executed via a processing unit on a computer perform a method for monitoring service endpoints, comprising:
performing a hash function upon identifiers of service endpoints to generate a monitoring scheme comprising an assignment of service endpoints to monitoring groups;
receiving a first status of a first service endpoint from a first monitoring node comprised within a first monitoring group;
receiving a second status of the first service endpoint from a second monitoring node comprised within the first monitoring group; and
resolving inconsistencies between the first status and the second status, comprising at least one of:
if the first status indicates the first service endpoint is operating in an unhealthy state and the second status indicates the first service endpoint is operating in a healthy state, then marking the first service endpoint as unhealthy, and
if the first status indicates the first service endpoint is operating in an unhealthy state and the second status indicates the first service endpoint is operating in a healthy state, then marking the first service endpoint as healthy.

20. The method of claim 19, comprising:
determining a failed monitoring group; and
redistributing one or more service endpoints assigned to the failed monitoring group within the monitoring scheme to one or more monitoring groups different from the failed monitoring group.

* * * * *